(12) United States Patent
Graj et al.

(10) Patent No.: US 6,698,064 B1
(45) Date of Patent: Mar. 2, 2004

(54) ERGONOMIC HANDLE

(76) Inventors: Simon Graj, 21 E. 4th St., New York, NY (US) 10003; Eric Gustavsen, 21 E. 4th St., New York, NY (US) 10003; Raymond Graj, 21 E. 4th St., New York, NY (US) 10003

( * ) Notice: Subject to any disclaimer, the term of this patent is extended or adjusted under 35 U.S.C. 154(b) by 0 days.

(21) Appl. No.: 09/697,111

(22) Filed: Oct. 26, 2000

(51) Int. Cl.⁷ .......................... A47J 45/00; A45C 13/22
(52) U.S. Cl. ............................ 16/430; 16/422; 16/425
(58) Field of Search ................. 16/430, 422, 425; 220/735, 744, 755, 756, 697, 759, 752, 769, 790; 294/55, 55.5, 25, 19.1

(56) References Cited

U.S. PATENT DOCUMENTS

| | | | | |
|---|---|---|---|---|
| 2,710,571 A | * | 6/1955 | Pfister | 294/57 |
| 2,989,334 A | * | 6/1961 | Browne | 294/104 |
| 4,924,924 A | * | 5/1990 | Stewart | 16/426 |
| 5,156,429 A | * | 10/1992 | Adams | 16/430 |
| 5,716,087 A | * | 2/1998 | Backich et al. | 16/430 |
| 5,771,535 A | * | 6/1998 | Blessing | 16/430 |
| 5,774,937 A | * | 7/1998 | Caminos | 16/430 |
| 5,802,960 A | * | 9/1998 | Graj et al. | 16/430 |

* cited by examiner

*Primary Examiner*—Chuck Y. Mah
(74) *Attorney, Agent, or Firm*—Schulte Roth & Zabel LLP; Anna Vishev, Esq.; John Garces, Esq.

(57) ABSTRACT

The present invention relates to an improved ergonomic handle that comprises an elongated member having a distal end, a proximal end, a first portion adjacent to the distal end, a second portion adjacent to the proximal end, and a middle portion disposed between the first portion and the second portion defining a grip. A hand supported implement is attached to the distal end of the elongated member, and the second portion is aligned along an axis and comprises a forearm support member. The middle portion forms an angle of substantially at least ninety degrees to the axis, and a barrier is formed at a junction between the first portion and the middle portion for inhibiting the handle from slipping out of a hand. A user grips the middle portion of the elongated member with his or her hand and places his or her forearm on the forearm support member. When the ergonomic handle is lifted, causing the hand supported implement to be lifted as well, the barrier lies on the user's index finger, preventing the ergonomic handle and the hand supported implement from slipping out of the user's hand.

16 Claims, 2 Drawing Sheets

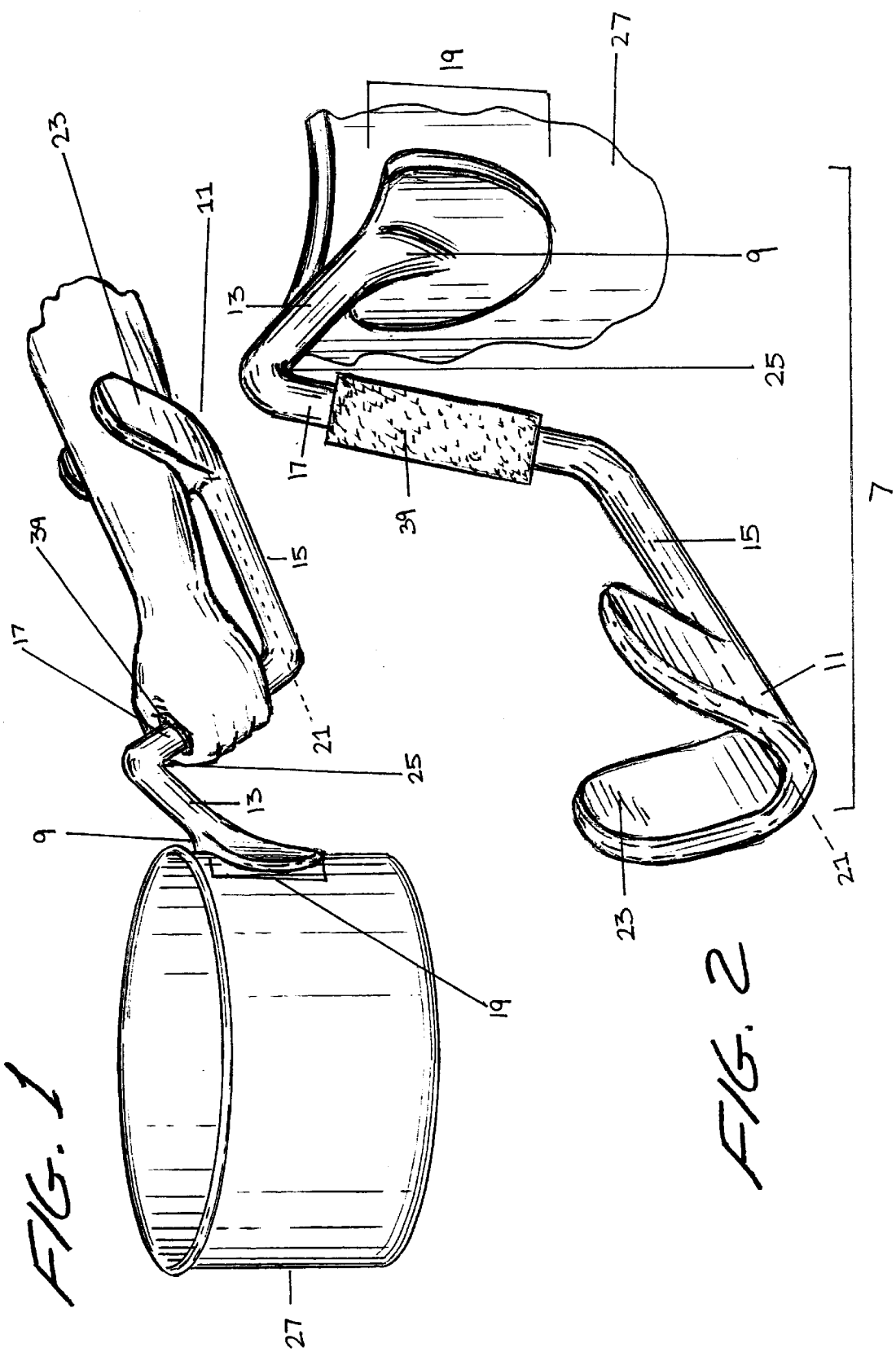

ERGONOMIC HANDLE

BACKGROUND

The present invention relates generally to handles for hand supported implements and, more particularly, is directed to an improved ergonomic handle that: redistributes the weight of a hand supported implement from the wrist and forearm muscles to the muscles in the upper arms and shoulders, provides a barrier to prevent the hand supported implement from slipping out of a hand while in use, incorporates an upright grip permitting a natural hand-wrist position, may be manufactured at a low cost from a single piece of material, and provides superior aesthetics.

Many individuals have difficulty lifting or manipulating hand supported implements having conventional linear handles due to a variety of physical conditions including, among others, arthritis in the wrists and infirm forearm muscles. These individuals also have difficulty handling such hand supported implements without the hand supported implements slipping out of their hands. Accordingly, there is a long recognized need to facilitate the use of a hand supported implement by using a superior handle which redistributes the weight of a hand supported implement from the wrist and forearm muscles to the muscles in the upper arms and shoulders and prevents the hand supported implement from slipping out of a hand while in use. The improved ergonomic handle claimed and described in the present invention addresses and fulfills this need.

There are various complex hand supported implement handles known in the prior art besides the standard linear handle. However, none of the structures in the prior art teach or suggest the present invention. For instance, U.S. Pat. No. 4,653,468 to Lemme et al. is directed to a cooking pan having a handle made up of a tubular stainless steel insert and upper and lower wires. The handle of this invention neither redistributes the weight of the cooking pan from the wrist and forearm muscles to the muscles in the upper arms and shoulders nor incorporates an upright grip permitting a natural hand-wrist position.

U.S. Pat. No. 5,313,735 to Latouche discloses a rotatable handle extension for attaching to fishing rods and the like, including cooking pots. Although the handle extension described in Latouche is contoured in an effort to shift the weight of an object attached to the handle from the wrist and forearm muscles to the muscles in the upper arm and shoulder, it neither provides a barrier for preventing the hand supported implement from slipping out of a hand while in use nor incorporates an upright grip permitting a natural hand-wrist position.

Similarly, U.S. Pat. No. 4,822,087 to DeCarlo, which shows a lift improvement device intended to improve the lifting characteristics of tools such as shovels, and the like, it does not provide a barrier for preventing the tool from slipping out of a hand while.

Likewise, U.S. Pat. No. 4,014,129 to Capra shows a fishing rod handle attachment that is intended to distribute forces to the forearm along the length of the handle. The invention described in Capra neither provides a barrier for preventing the fishing rod from slipping out of a hand while in use nor incorporates an upright grip permitting a natural hand-wrist position.

For the foregoing reasons, there is a need for an improved ergonomic handle that facilitates lifting and manipulating a hand supported implement, while preventing the hand supported implement from slipping out of a hand while in use.

SUMMARY

The present invention is directed to an improved ergonomic handle for hand supported implements that satisfies the need for a handle that facilitates lifting and manipulating a hand supported implement, while preventing the hand supported implement from slipping out of a hand while in use. An ergonomic handle having features of the present invention comprises an elongated member, the elongated member has a distal end, a proximal end, a first portion adjacent to the distal end, a second portion adjacent to the proximal end, and a middle portion disposed between the first portion and the second portion defining a grip. The distal end includes means for attaching the handle to a hand supported implement. The second portion is aligned along an axis and comprises a forearm support member. The middle portion forms an angle of substantially at least ninety degrees to the axis, and a barrier is formed at a junction between the first portion and the middle portion for inhibiting the handle from slipping out of a hand.

The present invention provides an improved handle which is shaped and angled so as to prevent the hand supported implement from slipping out of a hand, while providing an upright grip that permits a more natural and stable wrist hand position. Furthermore, the invention also satisfies the need for a handle which utilizes a lever principal to transfer the weight of the hand supported implement from the wrist and forearm muscles to the muscles of the upper arm and shoulder. In addition, the invention provides an ergonomic handle which may be manufactured at a low cost from a single piece of material and has superior aesthetics.

BRIEF DESCRIPTION OF THE DRAWINGS

These and other features, aspects, and advantages of the present invention will become better understood with regard to the following description, appended claims, and accompanying drawings where:

FIG. 1 shows a side view of an improved ergonomic handle in accordance with an embodiment of the present invention with a user's arm and hand preparing to lift the hand supported implement;

FIG. 2 depicts a perspective view of an improved ergonomic handle in accordance with an embodiment of the present invention;

DESCRIPTION

Figure 3:
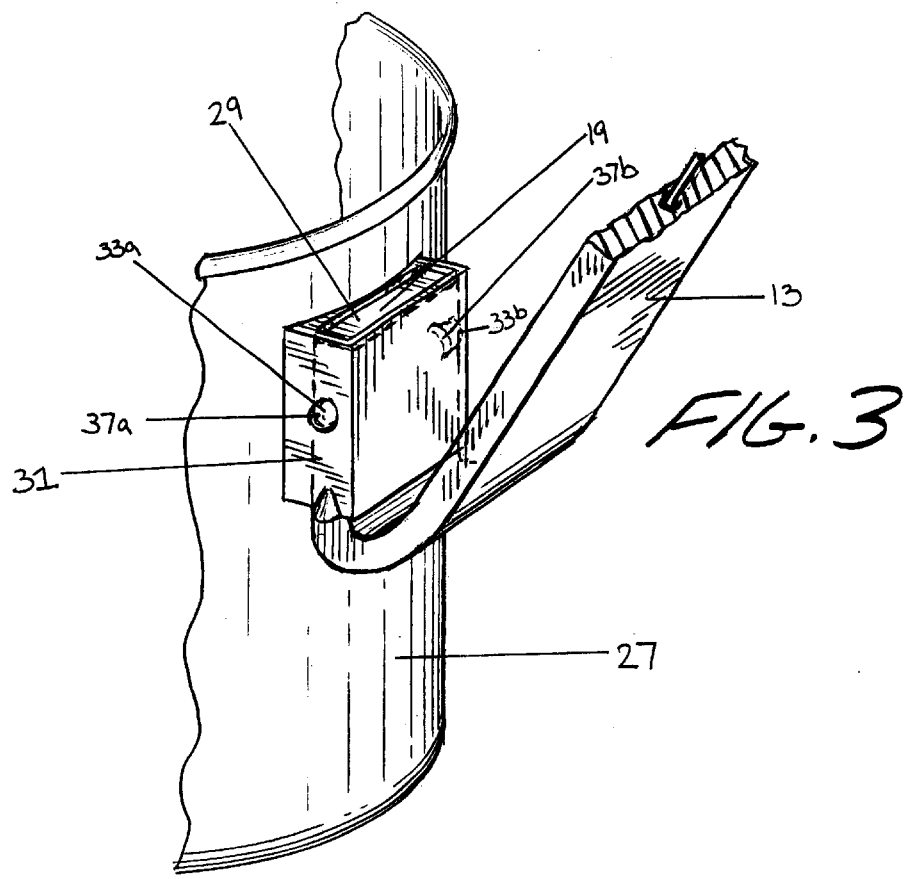
FIG. 3 shows a perspective view of the distal end of an improved ergonomic handle having a detachable fastener in accordance with an alternative embodiment of the present invention, being inserted into a slot disposed on the hand supported implement.

As shown in FIG. 1, an improved ergonomic handle 5 is generally formed with an elongated member 7 having a distal end 9 and a proximal end 11. The elongated member 7 includes a first portion 13 which is adjacent to the distal end 9, a second portion 15 which is adjacent to the proximal end 11, and a middle portion 17 disposed between the first portion 13 and the second portion 15 defining a grip 17.

The distal end 9 of the elongated member 7 either has means 19 for attaching the handle 5 to a hand supported implement 27 or can be permanently attached to a hand supported implement 27. Any means 19 for fastening and joining known to those skilled in the art including screws, glue, bolts, clamps, clips, rivets, hooks, clasps, latches, nuts, pins, pegs, slots, and slits, amongst others may be used to attach the handle 5 to the hand supported implement 27. The second portion 15 of the elongated member 7 is aligned along an axis 21 and includes a forearm support member 23. The middle portion 17 forms an angle of substantially at least ninety degrees to the axis 21, which the second portion 15 is aligned along. As a result of the shape of the elongated member 7, a barrier 25 is formed at a junction between the first portion 13 and the middle portion 17 for inhibiting the handle 5 from slipping out of a hand when in use.

To use the improved ergonomic handle 5 of the present invention as shown in FIG. 1, a user simply grips the middle portion 17 of the elongated member 7 with his or her hand and places his or her forearm on the forearm support member 23 of the second portion 15. When the ergonomic handle 5 is lifted, causing the hand supported implement 27 to be lifted as well, the barrier 25 lies on the user's index finger, preventing the ergonomic handle 5 and the hand supported implement 27 from slipping out of the user's hand.

In a preferred embodiment as shown in FIGS. 1 and 2, the hand supported implement 27 is permanently attached to the distal end 9 of the elongated member 7. Furthermore, the forearm support member 23 of the second portion 15 of the elongated member 7 is an upwardly directed concaved surface sized to support a forearm. Thus, the forearm support member 23 redistributes the weight of the hand supported implement 27 from the wrist and forearm muscles to the muscles in the upper arms and shoulders when the user's forearm is placed on the forearm support member 23. The handle 5 and the implement 27 may also be manufactured as one integral piece, forming an ergonomic hand supported utensil and eliminating the need to separately produce the handle 5 and the implement 27 and then permanently attach them.

Figure 4:
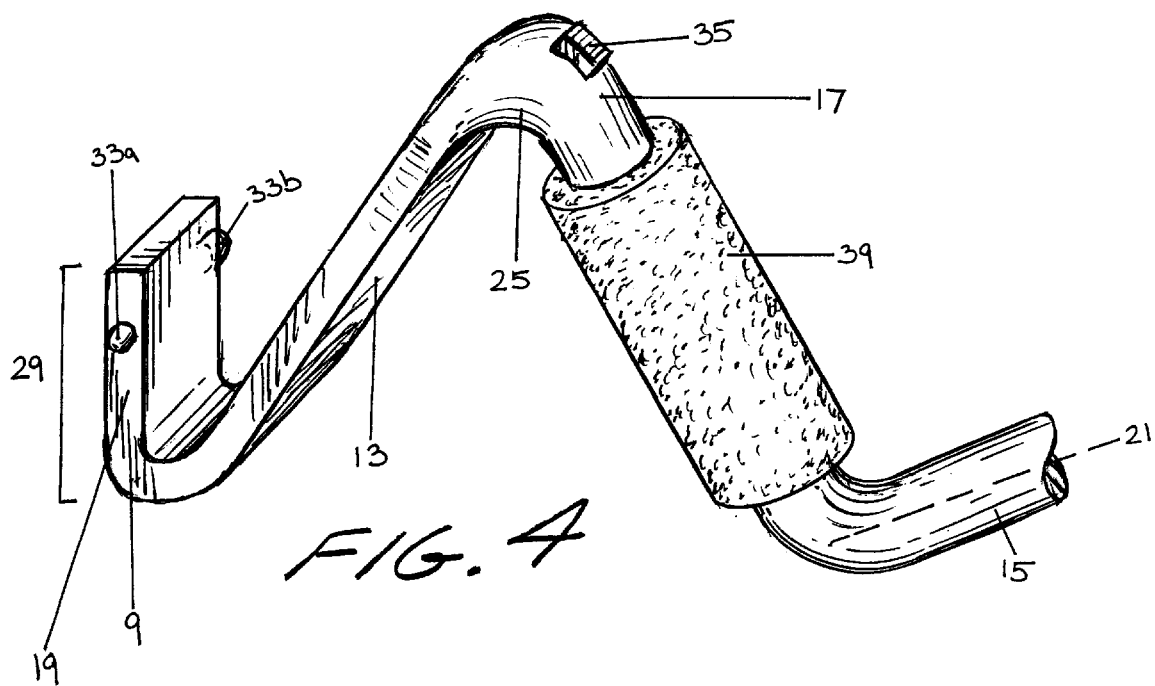
FIG. 4 shows a perspective view of an improved ergonomic handle having a detachable fastener in accordance with an embodiment of the present invention.

Turning now to FIGS. 3 and 4, in an alternative embodiment to that shown in FIGS. 1 and 2, the distal end 9 of the elongated member 7 includes a detachable fastener 29 which can be inserted into a slot 31 disposed on the hand supported implement 27. The detachable fastener 29 has two protrusions 33a and 33b which are retracted by depressing a button 35 disposed on the elongated member 7. The button 35 is mechanically attached to the two protrusions 33a and 33b by suitable cables, linkages, and levers or other mechanisms well known in the art. When the user desires to attach the handle 5 to the hand supported implement 27, the button 25 is depressed, causing the two protrusions 33a and 33b of the detachable fastener 29 to be retracted, and the detachable fastener 29 is then inserted into the slot 31 disposed on the hand supported implement 27, which has two holes 37a and 37b for engaging the two protrusions 33a and 33b of the detachable fastener. Once the detachable fastener 29 of the elongated member 7 is inserted into the slot 31 disposed on the hand supported implement 27, the button 35 is released causing the protrusions 33a and 33b to be released and interlocked with the two holes 37a and 37b of the slot 31. Accordingly, the hand supported implement 27 becomes securely fastened to the handle 5.

Although the hand supported implement 27 shown in FIGS. 1 through 4 is a pot, the improved ergonomic handle 5 can be used with different hand supported implements 27 including garden tools, carts, carriages, other types of cookware, fishing rods and other fishing tools, nets, shovels, medical devices, climbing devices, snow-removing devices, jack-hammers, firearms, metal detectors, walking device, crow-bars, and wrenches. Furthermore, the improved ergonomic handle 5 of the present invention can be made of any material including polymeric materials, ceramics, minerals, and metals; however, when the hand supported implement 27 is a type of cookware, it is preferable that the hand supported implement 27 is at least partially manufactured from heat-resistant material. The improved ergonomic handle 5 of the present invention may be manufactured at a low cost from a single piece of material.

The middle portion 17 of the elongated member 7 may be shaped to perfectly engage a user's hand or may be covered with any material 39, as shown in FIGS. 1, 2 and 4, to provide comfort and increase friction between the user's hand and the improved ergonomic handle 5. Moreover, the forearm support member 23 can be any configuration which supports a forearm. An aperture may be provided on the elongated member 7 for facilitating storage of the improved ergonomic handle 5.

As will be appreciated, the previously described versions of the present invention have many advantages, including: redistributing the weight of the hand supported implement 27 from the wrist and forearm muscles to the muscles in the upper arms and shoulders, providing a barrier 25 to prevent the hand supported implement 27 from slipping out of a hand while in use, incorporating an upright grip permitting a natural hand-wrist position, reducing manufacturing costs, and providing superior aesthetics.

A problem often associated with conventional linear handles is that many individuals have difficulty lifting or manipulating hand supported implements 27 having conventional handles due to a variety of physical conditions including, among others, arthritis in the wrists and infirm forearm muscles. These individuals also have difficulty handling such hand supported implements 27 without the hand supported implements 27 slipping out of their hands. The improved ergonomic handle 5 of the present invention provides a handle which is shaped and angled so as to prevent the hand supported implement 27 from slipping out of a hand, while providing an upright grip that permits a more natural and stable wrist hand position. The invention also satisfies the need for a handle which utilizes a lever principal to transfer the weight of the hand supported implement 27 from the wrist and forearm muscles to the muscles of the upper arm and shoulder. In addition, the invention provides an ergonomic handle 5 which may be manufactured at a low cost from a single piece of material and has superior aesthetics.

Having described preferred embodiments of the invention with reference to the accompanying drawings, it will be appreciated that the present invention is not limited to those precise embodiments, and that various changes and modifications can be effected therein by one or ordinary skill in the art without departing from the spirit or the scope of the invention as defined in the appended claims.

What is claimed is:

1. An ergonomic handle comprising:
   a tubular elongated member, said elongated member having
   a distal end and a proximal end;
   a first portion adjacent to said distal end;
   a second portion adjacent to said proximal end;
   a middle portion defining a tubular grip disposed between said first portion and said second portion;
   said distal end including
   means for attaching said handle to a hand supported implement, wherein said handle is completely detachable from said hand supported implement:

a button disposed on said elongated member for detaching said handle from said hand supported implement;
said second portion aligning along an axis and comprising
a forearm support member that substantially surrounds a user's forearm;
said middle portion forming an angle of substantially at least ninety degrees to said axis;
said middle portion forming a second angle of less than ninety degrees with said first portion; and,
a barrier formed at a junction between said first portion and said middle portion for inhibiting said handle from slipping out of a hand.

2. An ergonomic handle as in claim 1, wherein said forearm support member comprises
an upwardly directed concaved surface sized to support a forearm.

3. An ergonomic handle according to claim 1, wherein said handle is formed of a single piece of material.

4. An ergonomic handle as defined in claim 1, wherein said handle is at least partially heat-resistant.

5. An ergonomic handle comprising:
a tubular elongated member, said elongated member having
a distal end and a proximal end;
a first portion adjacent to said distal end;
a second portion adjacent to said proximal end;
a middle portion defining a tubular grip disposed between said first portion and said second portion;
said distal end including
a detachable fastener for completely detaching said handle from a hand supported implement;
said elongated member further comprising a button for completely detaching said handle from said hand supported implement:
said second portion aligning along an axis and comprising
a forearm support member that substantially surrounds a user's forearm;
said middle portion forming an angle of substantially at least ninety degrees to said axis;
said middle portion forming a second angle of less than ninety degrees with said first portion; and,
a barrier formed at a junction between said first portion and said middle portion for inhibiting said handle from slipping out of a hand.

6. An ergonomic handle as in claim 5, wherein said forearm support member comprises
an upwardly directed concaved surface sized to support a forearm.

7. An ergonomic handle according to claim 5, wherein said handle is formed of a single piece of material.

8. An ergonomic handle as defined in claim 5, wherein said handle is at least partially heat-resistant.

9. An ergonomic handle comprising:
a tubular elongated member, said elongated member having
a distal end and a proximal end;
a first portion adjacent to said distal end;
a second portion adjacent to said proximal end;
a middle portion defining a tubular grip disposed between said first portion and said second portion;
a hand supported implement attached to said distal end of said elongated member, wherein said hand supported implement is completely removable from said handle by a button disposed on said elongated member;
said second portion aligning along an axis and comprising
a forearm support member that substantially surrounds a user's forearm;
said middle portion forming an angle of substantially at least ninety degrees to said axis;
said middle portion forming a second angle of less than ninety degrees with said first portion; and,
a barrier formed at a junction between said first portion and said middle portion for inhibiting said handle from slipping out of a hand.

10. An ergonomic handle as in claim 9, wherein said forearm support member comprises
an upwardly directed concaved surface sized to support a forearm.

11. An ergonomic handle as in claim 9, wherein said hand supported implement comprises a cooking utensil.

12. An ergonomic handle according to claim 9, wherein said hand supported implement comprises a hand tool.

13. An ergonomic handle according to claim 9, wherein said handle is formed of a single piece of material.

14. An ergonomic handle as defined in claim 9, wherein said handle is at least partially heat-resistant.

15. An ergonomic hand supported utensil comprising:
a tubular elongated member, said elongated member having
a distal end and a proximal end;
a completely removable implement disposed at said distal end, wherein said implement is removable by a button disposed on said elongated member;
a first portion adjacent to said implement;
a second portion adjacent to said proximal end;
a middle portion defining a tubular grip disposed between said first portion and said second portion;
said second portion aligning along an axis and comprising
a forearm support member that substantially surrounds a user's forearm;
said middle portion forming an angle of substantially at least ninety degrees to said axis;
said middle portion forming a second angle of less than ninety degrees with said first portion; and,
a barrier formed at a junction between said first portion and said middle portion for inhibiting said hand supported implement from slipping out of a hand.

16. An ergonomic hand supported utensil as set forth in claim 15, wherein said utensil is formed of a single piece of material.

* * * * *